(12) United States Patent
Strosser

(10) Patent No.: US 7,881,844 B2
(45) Date of Patent: Feb. 1, 2011

(54) APPARATUS AND METHOD TO VARY THE SENSITIVITY SLOPE OF THE FNR CONTROL LEVER OF AN AGRICULTURAL WINDROWER

(75) Inventor: Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 1212 days.

(21) Appl. No.: 11/486,357

(22) Filed: Jul. 13, 2006

(65) Prior Publication Data

US 2007/0027600 A1 Feb. 1, 2007

Related U.S. Application Data

(60) Provisional application No. 60/699,640, filed on Jul. 15, 2005.

(51) Int. Cl.
*G06F 9/00* (2006.01)
(52) U.S. Cl. .......................... 701/50; 701/93; 180/338; 180/364; 477/107; 477/97
(58) Field of Classification Search .................. 701/50, 701/93; 477/97, 107; 180/338, 364
See application file for complete search history.

(56) References Cited

U.S. PATENT DOCUMENTS

| 3,914,938 | A |   | 10/1975 | Cornell et al. ................ 60/395 |
| 4,444,286 | A |   | 4/1984 | Hawkins et al. ............. 180/197 |
| 4,594,666 | A | * | 6/1986 | Cornell ......................... 701/58 |
| 4,663,714 | A | * | 5/1987 | Cornell et al. ................ 701/52 |
| 4,699,239 | A | * | 10/1987 | Ishino et al. ................. 180/315 |
| 4,704,866 | A | * | 11/1987 | Myers .......................... 60/449 |
| 4,809,173 | A |   | 2/1989 | Fukami et al. ......... 364/424.05 |
| 5,565,760 | A |   | 10/1996 | Ball et al. ...................... 322/23 |
| 5,784,883 | A | * | 7/1998 | Ohkura et al. ................ 60/327 |
| 6,247,378 | B1 | * | 6/2001 | Newendorp et al. ....... 74/473.12 |
| 6,309,324 | B1 | * | 10/2001 | Sawa et al. ................... 477/125 |
| 6,425,450 | B1 | * | 7/2002 | Lansberry .................. 180/9.36 |
| 6,704,643 | B1 | * | 3/2004 | Suhre et al. .................. 701/115 |
| 6,901,729 | B1 |   | 6/2005 | Otto et al. ..................... 56/208 |
| 7,082,361 | B2 | * | 7/2006 | Berger et al. .................. 701/93 |
| 7,310,943 | B2 | * | 12/2007 | Burgart et al. ................ 60/433 |
| 7,373,776 | B2 | * | 5/2008 | Burgart et al. ................ 60/443 |
| 7,603,218 | B2 | * | 10/2009 | Fackler et al. ................. 701/50 |
| 2005/0014427 | A1 |   | 1/2005 | Yoda et al. ..................... 440/86 |
| 2005/0088122 | A1 |   | 4/2005 | Wakitani et al. .............. 318/66 |
| 2005/0090949 | A1 |   | 4/2005 | Wakitani et al. .............. 701/22 |
| 2005/0170715 | A1 |   | 8/2005 | Yoda et al. ..................... 440/75 |
| 2005/0177297 | A1 | * | 8/2005 | Berger et al. .................. 701/93 |

* cited by examiner

*Primary Examiner*—Khoi Tran
*Assistant Examiner*—Nikhil Sriraman
(74) *Attorney, Agent, or Firm*—Patrick M. Sheldrake; Michael G. Harms

(57) ABSTRACT

The apparatus and method of the invention vary the sensitivity slope of the FNR control lever of an agricultural windrower, such that speed commands outputted through a first range of movements of the FNR lever are slower and increase less rapidly than commands outputted through a second range of movements greater than the first range, the first range corresponding to movements in closer proximity to the neutral position of the FNR lever. The different show is achieved by using different slopes for transfer function signals for the first and the second ranges of positions of the FNR lever.

8 Claims, 4 Drawing Sheets

```
propulsion.c
460         //Warning will be displayed when propulsion_main is called Operator should be alerted to run valve calib
            ee_propulsion_valve_rev_tank_crack_ma_b3_ui = 0xfc00;                                          //, error
      }

465   DispPID_init();

propulsion_Icntrl_init();

470   _state_estop_b0_uc = _state_estop_DEFAULT;
      _prop_timer_ui = _timer01_ui=_timer02_ui=0;
      _cyl_command=0;
      _valve_cal_state_b0_uc = 0;
      _ESTOP_started_by_park_brake_bt = FALSE;

475   _fault_F409_03_set_flag_bt = _fault_F410_07_set_flag_bt = 0;

_fnr_slope_pt1_v_b11_si = ( ( (ee_fnr_full_fwd_v_b11_ui) + (2 * (ee_mfh_fwd_swpoint_going_out_v_b11_ui) ) )/3

480   FN_fnr_v_b11_si_to_distance_d_b12_si[0].x = 0x8000;
      FN_fnr_v_b11_si_to_distance_d_b12_si[1].x = ee_fnr_full_fwd_v_b11_ui;
      FN_fnr_v_b11_si_to_distance_d_b12_si[2].x = _fnr_slope_pt1_v_b11_si;
      FN_fnr_v_b11_si_to_distance_d_b12_si[3].x = ee_mfh_fwd_swpoint_going_out_v_b11_ui;
      FN_fnr_v_b11_si_to_distance_d_b12_si[4].x = ee_mfh_rev_swpoint_going_out_v_b11_ui;
485   FN_fnr_v_b11_si_to_distance_d_b12_si[5].x = ee_fnr_full_rev_v_b11_ui;
      FN_fnr_v_b11_si_to_distance_d_b12_si[6].x = 0x7fff;

_sensor_wiggle_state_b0_uc = 0;
490   }

/*************************************************************/
495   static  void put_ee_propulsion_valve_fwd_port_crack_ma_b3_ui( signed int __X )
      {
          EE_propulsion_valve_fwd_port_crack_ma_b3_si = __X;
          ee_propulsion_valve_fwd_port_crack_ma_b3_ui = (unsigned int)( __X + ( 4000 * BIN3 ) );
      }

500   /*************************************************************/
      static  void put_ee_propulsion_valve_fwd_tank_crack_ma_b3_ui( signed int __X )
      {
          EE_propulsion_valve_fwd_tank_crack_ma_b3_si = __X;
505       ee_propulsion_valve_fwd_tank_crack_ma_b3_ui = (unsigned int)( __X + ( 4000 * BIN3 ) );
      }

/*************************************************************/
510   static  void put_ee_propulsion_valve_rev_port_crack_ma_b3_ui( signed int __X )
```

Fig. 4

APPARATUS AND METHOD TO VARY THE SENSITIVITY SLOPE OF THE FNR CONTROL LEVER OF AN AGRICULTURAL WINDROWER This application claims the benefit of U.S. Provisional Application No. 60/699,640, filed Jul. 15, 2005.

TECHNICAL FIELD

The present invention relates to agricultural windrowers and, more particularly, to apparatus and a method, embodied in a computer program, to vary the sensitivity slope of the FNR control lever of an agricultural windrower.

BACKGROUND OF THE INVENTION

U.S. Provisional Application No. 60/699,640, filed Jul. 15, 2005, is incorporated herein in its entirety by reference. U.S. Pat. No. 6,901,729 is also incorporated herein in its entirety by reference.

Vehicles, such as, but not limited to, agricultural windrowers, can utilize control algorithms for translating input signals, for instance, from operator controlled input devices such as a forward-neutral-reverse (FNR) lever, also sometimes referred to as a multi-function-handle (MFH), to systems to be controlled thereby, such as the propulsion driveline.

Typically, windrowers utilize differential steering, wherein the drive wheels of the windrower are driven at different speeds, to effect changes in direction. Also typically, windrowers are driven along long swaths through a field to be harvested, then are turned by a large angle, for instance 180°, into the next swath to be harvested. Windrowers utilize a sidewardly elongate header for severing crops from the field and redepositing the severed crops on the field in a windrow. The width of the header increases complexity of steering movements required for maneuvering the windrower. And, from time to time, the header is removed from the windrower and replaced, either with the same header, or a different header. For replacement, elongate, forwardly extending arms of the windrower are typically maneuvered into position beneath the header for engaging cups thereon when the arms are raised, for installing the header on the windrower. Such maneuvers can require slow speed precise movements of the windrower. Windrowers often include a selectable low speed range which is utilized for such slower speed movements. However, even when in the slow speed range, it has been found that it would be desirable to have a capability for movements of the FNR lever to command even slower movements, to enable better control during steering and header installation.

It is therefore desirable to have a capability to more precisely effect slow speed movements and maneuvers of a windrower, utilizing a FNR lever, for turning, installing a header, and the like.

SUMMARY OF THE DISCLOSURE

Accordingly, what is disclosed is an apparatus and method for effecting slow speed movements and maneuvers of a windrower utilizing a FNR lever, for turning, installing a header, and like maneuvers.

According to a preferred aspect of the invention, the apparatus includes a FNR lever assembly including a FNR lever having a neutral position and movable from the neutral position in a first direction through a range of positions to a position fully moved in the first direction, and the FNR lever being movable from the neutral position in a second direction through a range of positions to a position fully moved in the second direction. The apparatus includes at least one sensor disposed and operable for sensing positions of the FNR lever as the lever is moved in the first and second directions and outputting signals representative thereof, which sensor is preferably a potentiometer. The apparatus additionally includes a programmable control module in connection with the at least one sensor and with apparatus for controlling a speed of the propulsion driveline, the control module being programmed and operable for receiving the signals outputted by the at least one sensor and generating transfer function signals for determining speed command signals to be outputted to the apparatus for controlling the speed of the propulsion driveline as a function of the received signals. The transfer function signals for a first range of positions of the FNR lever, preferably for producing slower speeds of the propulsion driveline, have a first slope. The transfer function signals for a second range of positions of the FNR lever, preferably for producing higher speeds of the propulsion driveline, and greater than the first range of positions, have a second slope, the first slope being less than the second slope.

The first range of positions of the FNR lever preferably correspond to positions between the neutral position and a predetermined position between the neutral position and the fully moved position, and the second range of positions of the lever correspond to positions between the predetermined position and the fully moved position. The different slopes can be applied to both directions of movement, or just one.

As a result, speed commands inputted through movements of the FNR lever within the first range will have less magnitude, and change less rapidly, than speed commands included through movements of the lever within the second range. Thus, more precise control of speed within the slower speed ranges is achieved, to facilitate maneuvers for turning and installation of a header or the like.

According to another preferred aspect of the invention, the first slope is about 50 percent less than the second slope, although other slope differences can be used as desired or required for a particular application.

According to another preferred aspect of the invention, the transition point is calculated automatically from Neutral and Full Forward positions derived during FNR calibration, thus independent of FNR sensor and mechanical components tolerances.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a listing of lines of code of a computer program embodying steps of a preferred embodiment of a method of the instant invention.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. Still further, in this description, the terms FNR lever, multi-function handle and MFH referred to the same item, and therefore are interchangeable.

Figure 1:
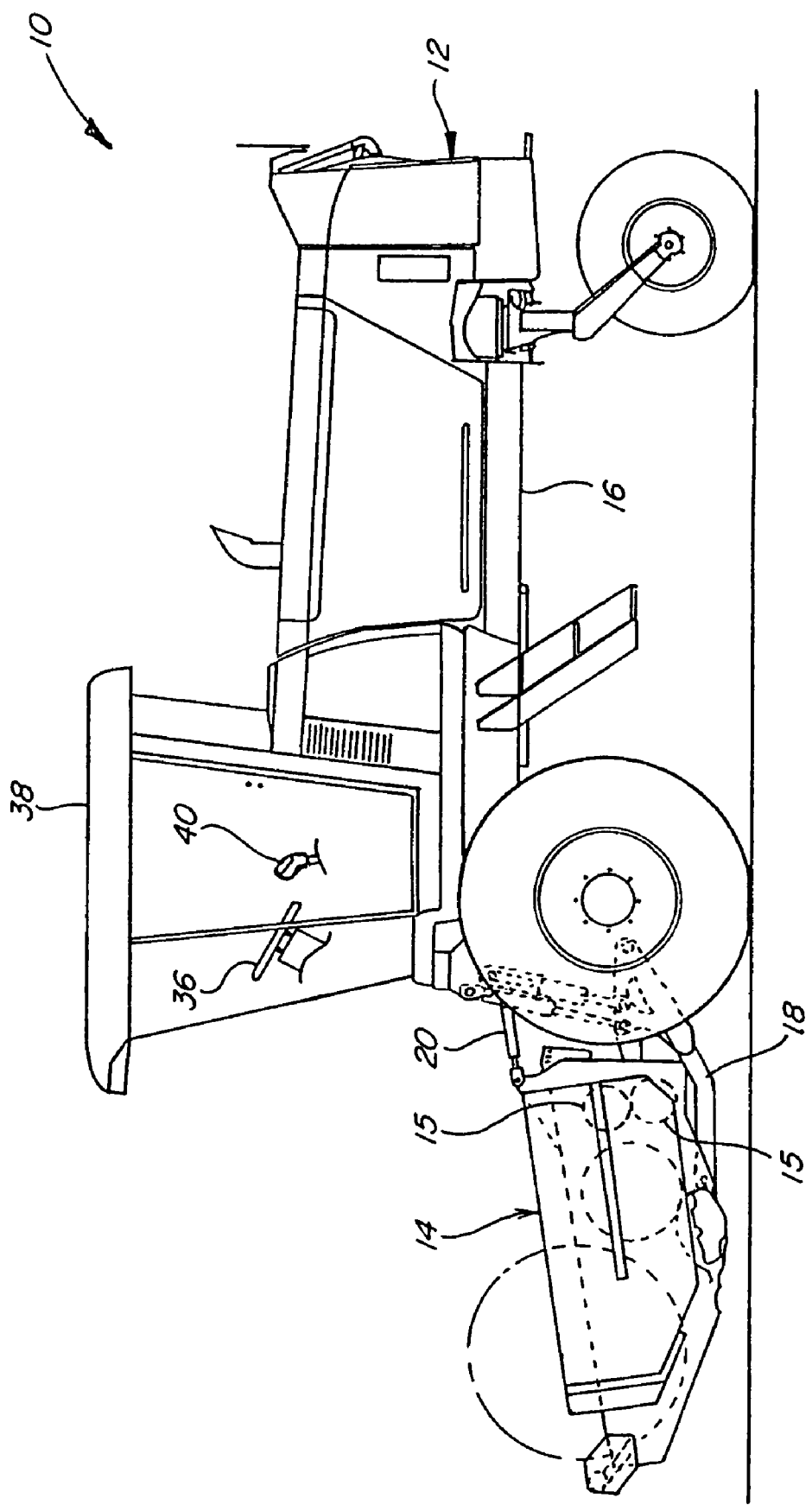
FIG. 1 is a partial side elevational view of a windrower of the type with which the invention may be used, including a header for severing crops from a field, mounted on a front end of the windrower.

FIG. 1 shows a self-propelled windrower 10 incorporating the apparatus and method of the invention; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not-only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20.

One or more cylinders, such as individual lift and flotation cylinders, or a single lift/flotation cylinder, interconnects the lower arm 18 and the frame 16 on each side of the header.

Typical features and operation of a system for controlling the lift and flotation functions for a header, such as header 14 depicted herein, are disclosed in U.S. Pat. No. 6,901,729, incorporated herein by reference.

Figure 2:
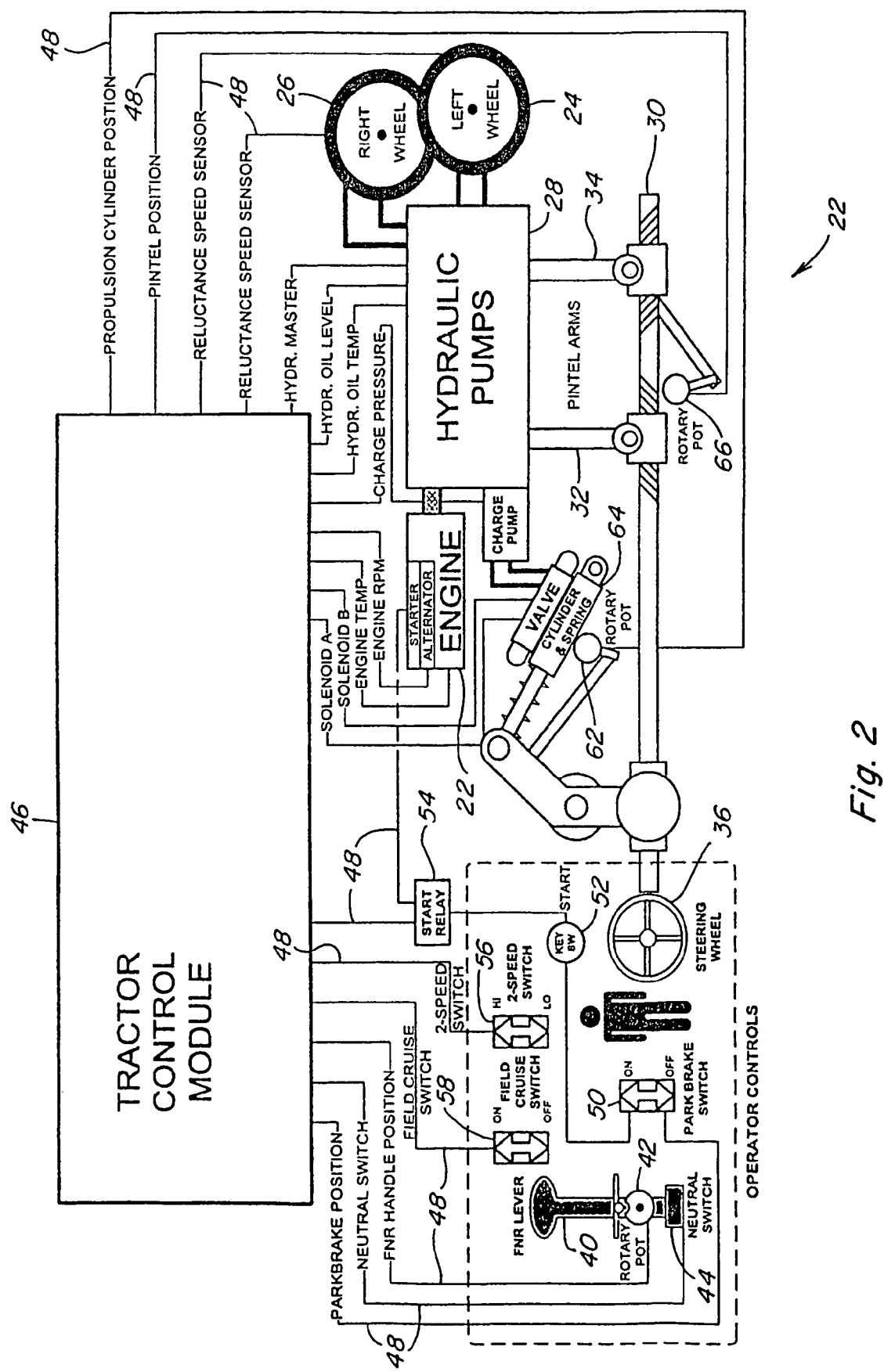
FIG. 2 is a simplified diagrammatic representation of a propulsion driveline of the windrower incorporating aspects of the instant invention.

Referring also to FIG. 2, windrower 10 includes a propulsion driveline 22 controllably operable using operator controls for rotatably driving a left wheel 24 and a right wheel 26 for propelling windrower 10 over a ground or other surface. Hydraulic motors (not shown) in connection with each wheel 24 and 26, respectively, are provided with fluid under pressure by hydraulic pumps 28, for driving the wheels. The pumps 28 can be differentially controlled for supplying different and varying amounts of pressurized fluid to the hydraulic motors, for effecting desired movements of windrower 10, including steering movements, as effected by operation of a rotatable and longitudinally movable propulsion rod 30 in connection with pintel arms 32 and 34 movable for controlling displacement of pumps 28 in the well-known manner. Steering commands are inputted to driveline 22 by an operator via an operator control which is a steering wheel 36 disposed in an operator cab 38 of windrower 10. Steering movements of windrower 10 are effected by rotating respective wheels 24 and 26 at different speeds. Propulsion speed and direction commands are inputted to driveline 22 by an operator via an operator control which is a FNR lever 40 also disposed in cab 38.

FNR lever 40 is configured to operate a suitable sensor or sensors operable for generating varying information or outputs representative of the position of lever 40 when lever 40 is manipulated or moved, preferably including one or two rotary potentiometers 42 and a neutral switch 44, each of which is connected to a tractor control module 46 via a suitable conductive path or paths 48, which can be, for instance, a wire or wires of a wiring harness, an optical path, a wireless path, or the like. Movements of FNR lever 40 in relation to the neutral position will cause potentiometers 42 to output varying signals representative of the position of lever 40, which signals comprise voltages. It is desired for these voltage signals to very precisely indicate the position of lever 40, such that precise control of the forward and rearward movements of windrower 10 can be achieved.

Neutral switch 44 is also mounted and configured such that movements of FNR lever 40 into the neutral position, and out of the neutral position, will cause changes in the operating state of switch 44. Here, forward and rearward movements of FNR lever 40 from a generally straight up neutral position shown, will effect a change of state of switch 44 which will be outputted to control module 46, which will responsively power up the propulsion driveline, control module 46 controlling the propulsion speed of windrower 10 as a function of the voltage outputs of one or both potentiometers 42. Similarly, rearward movement of FNR lever 40 from the neutral position will effect a change of state of switch 44 outputted to control module 46 to affect operation of the propulsion driveline in the reverse direction, and the voltage output of one or both of the potentiometers 42 will be used to control reverse speed. It is also desired that, when lever 40 is moved into the neutral position, the propulsion system be controlled to positively de-stroke or otherwise transition into a non-propelling state over time, such that abrupt stoppage does not occur.

Other operator controls include a park brake switch 50 also connected to tractor control module 46 via a conductive path 48, and via another conductive path 48 to a key switch 52 and a start relay 54 in connection with a starter of engine 22 and with tractor control module 46. A 2-speed switch 56 is connected to tractor control module 46 via another conductive path 48, as is a field cruise switch 58.

Tractor control module 46 is connected to a second tractor control module 60 via a controller area network (CAN). Tractor control module 60 is in connection with a rotary potentiometer 62 via a conductive path 48, potentiometer 62 being operable for outputting information representative of the position of a propulsion cylinder 64. Propulsion cylinder 64 is extendable and retractable by solenoids controlled by tractor control module 60, based on the voltage outputs of at least one of potentiometers 42, to move propulsion rod 30 longitudinally for changing the stroke of the hydraulic pumps 28 via the angle of the pintel arms 32 and 34, for effecting propulsion of the windrower. A rotary potentiometer 66 is operable for outputting information representative of the position of pintel arms 32 and 34 to module 60 via another conductive path 48, providing information representative of differential stroking of pumps 28 to effect steering movements. Information representative of speed of respective wheels 24 and 26 is determined by reluctance speed sensors and is communicated via conductive paths 48 to module 60. Differences in the speed readings is also indicative of steering movements.

More particularly with regard to the advantages of the present invention, FNR lever 40 is movable from the neutral position in a first direction through a range of positions to a position fully moved in the first direction, and from the neutral position in a second direction through a range of positions to a position a fully moved in the second direction. One direction of movement will effect movement of windrower 10 in the forward direction, and the other direction will effect movement in the rearward direction. The control module is programmed and operable for receiving the signals outputted by the potentiometer or potentiometers 42, and generating transfer function signals for determining speed command signals to be outputted to the solenoids controlling the propulsion cylinder 64 for controlling the speed of propulsion driveline 22 as a function of the received signals.

Figure 3:
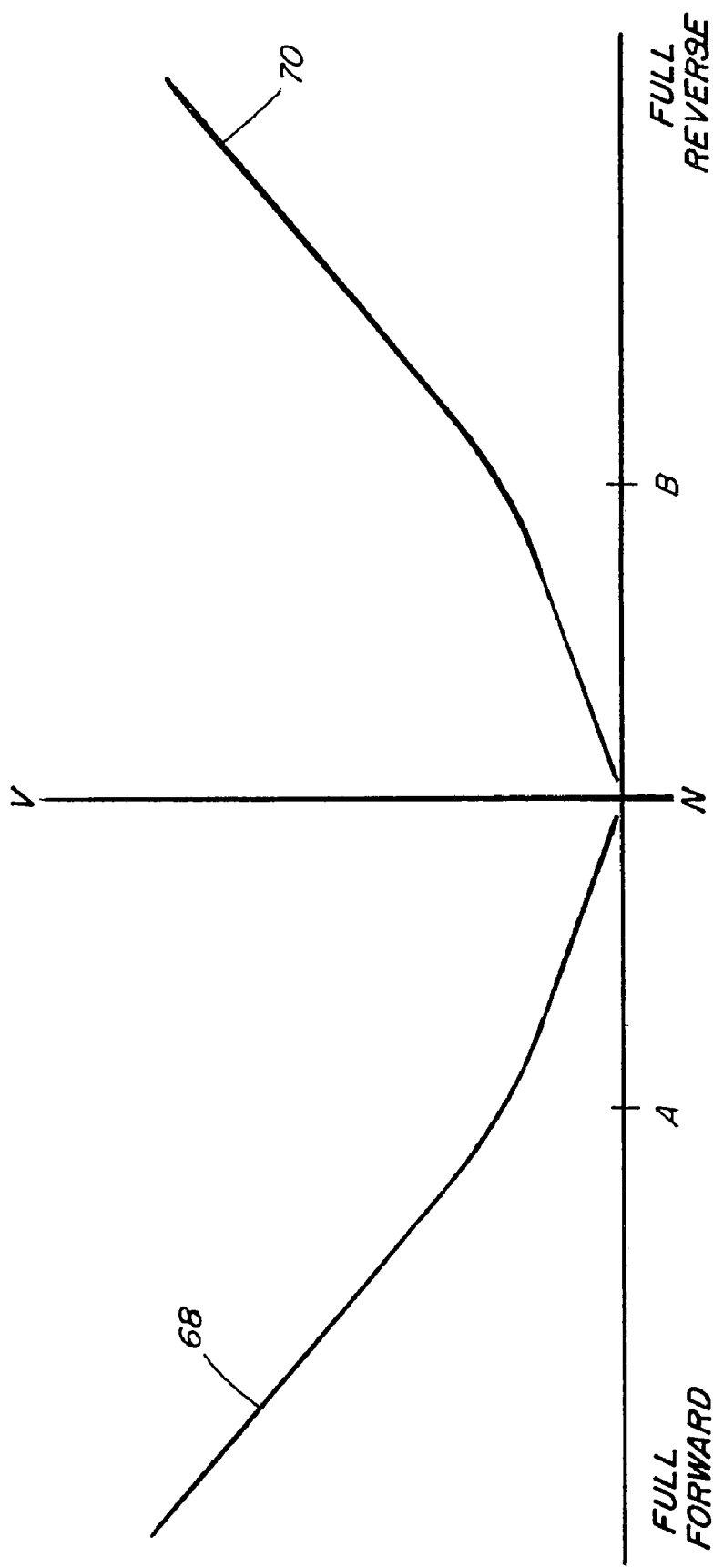
FIG. 3 is a simplified graphical representation of velocity verses FNR lever position obtained according to a preferred embodiment of a method of the instant invention.

Referring also to FIG. 3, the transfer function signals for speed commands for forward movements of windrower 10 are denoted by a trace 68, and the transfer function signals for speed commands for rearward movements are denoted by a trace 70. A first range of positions of FNR lever 40 in the forward direction extends between line N and about point A, representing slower forward speeds of windrower 10, and a second range of positions in the forward direction extends between about point A and full forward, which is the full extent of movement of FNR lever 40 in the forward direction. The points A and B are automatically derived during a calibration procedure performed by the operator. Similarly, a first range of positions of FNR lever 40 in the rearward direction extends between line N and about point B, and a second range of positions in the rearward direction extends between point B and full reverse, which is the full extent of movement of lever 40 in the rearward direction. The first range of forward positions between line N and point A has a first slope, and the second range of forward positions between point A and full forward, has a second slope, the first slope preferably being about 50% of the second slope. Similarly, the first range of rearward positions between line N and point B has a first slope, and the second range of rearward positions between point B and full rearward, has a second slope, again, the first slope preferably being about 50% of the second slope.

As a result, speed commands inputted through movements of FNR lever 40 within the first range in both directions will have less magnitude, and change less rapidly, than speed commands included through movements of lever 40 within the second range. Thus, more precise control of speed within the slower speed ranges is achieved, to facilitate maneuvers for turning and installation of a header or the like.

The preferred method of the invention is embodied in a computer program, lines of which are set forth in FIG. 4.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. Apparatus for controlling a propulsion driveline of an agricultural windrower, comprising:
    a FNR lever assembly including a FNR lever having a neutral position and movable from the neutral position in a first direction through a range of positions to a position fully moved in the first direction, and the FNR lever being movable from the neutral position in a second direction through a range of positions to a position fully moved in the second direction, and at least one sensor disposed and operable for sensing positions of the FNR lever as the lever is moved in the first and second directions and outputting signals representative thereof; and
    a programmable control module in connection with the at least one sensor and with apparatus for controlling a speed of the propulsion driveline, the control module being programmed and operable for receiving the signals outputted by the at least one sensor and generating transfer function signals for determining speed command signals to be outputted to the apparatus for controlling the speed of the propulsion driveline as a function of the received signals, the transfer function signals for a first range movements of the FNR lever having a first slope, and the transfer function signals for a second range of movements of the FNR lever farther from the neutral position than the first range having a second slope, the control module configured and operable to automatically calculate a transition point between the slopes as a function of the locations of a neutral position and a position fully moved in at least one of the first and second directions determined during the calibration of the FNR lever and corresponding to each range such that a value of the first slope is maintained at a value less than the second slope wherein automatically calculated values of first slopes do not exceed values of corresponding second slopes such that movements of the lever closer to the neutral position in at least one direction having the first slope are maintained to result in lower changes in speed of the propulsion driveline than the movements further from the neutral position having the second slope.

2. The apparatus of claim 1, wherein the first slope is about 50 percent less than the second slope.

3. The apparatus of claim 1, wherein the control module is configured such that the travel of the FNR lever over which the first slope is applied and the travel of the FNR lever over which the second slope is applied is calculated as a function of a ratio of the total range of travel between the detected neutral position and the detected fully moved position in at least one direction.

4. The apparatus of claim 1, wherein the first range of movements of the FNR lever direction comprise movements between the neutral position and a predetermined position intermediate the neutral position and the position fully moved in a first direction and correspond to forward motion commands to the vehicle, wherein the control module is configured to similarly calculate first and second slopes corresponding to first and second ranges of movement of the lever in the second direction with respect to the neutral position and correspond to reversed motion commands to the vehicle.

5. A method for controlling a speed of a propulsion driveline of an agricultural windrower, comprising steps of:
    providing a FNR lever assembly including a FNR lever having a neutral position and movable from the neutral position in a first direction through a range of positions to a position fully moved in the first direction, and the FNR lever being movable from the neutral position in a second direction through a range of positions to a position fully moved in the second direction, and at least one sensor disposed and operable for sensing positions of the FNR lever as the lever is moved in the first and second directions and outputting signals representative thereof;
    providing a programmable control module in connection with the at least one sensor and with apparatus for controlling a speed of the propulsion driveline, wherein the control module will:

receive the signals outputted by the at least one sensor and generate transfer function signals for determining speed command signals to be outputted to the apparatus for controlling the speed of the propulsion driveline as a function of the received signals, the transfer function signals for a first range of movements of the FNR lever having a first slope, and the transfer function signals for a second range of movements of the FNR lever farther from the neutral position than the first range of movements having a second slope, wherein the control module is configured such that the travel of the FNR lever over which the first slope is applied and the travel of the FNR lever over which the second slope is applied is calculated as a function of ratio of the total range of travel between the detected neutral position and the detected fully moved position in at least one direction such that the first slope is maintained less than the second slope.

6. The method of claim 5, wherein the first slope is about 50 percent less than the second slope.

7. A method for controlling a speed of a propulsion driveline of an agricultural windrower, comprising steps of:

providing a FNR lever assembly including a FNR lever having a neutral position and movable from the neutral position in a first direction through a range of positions to a position fully moved in the first direction, and the FNR lever being movable from the neutral position in a second direction through a range of positions to a position fully moved in the second direction, and at least one sensor disposed and operable for sensing positions of the FNR lever as the lever is moved in the first and second directions and outputting signals representative thereof;

providing a programmable control module in connection with the at least one sensor and with apparatus for controlling a speed of the propulsion driveline, the control module being programmed and operable for receiving the signals outputted by the at least one sensor and generating transfer function signals for determining speed command signals to be outputted to the apparatus for controlling the speed of the propulsion driveline as a function of the received signals, wherein the control module will:

generate the transfer function signals for a first range of speeds of the propulsion driveline having a first slope; and generate the transfer function signals for a second range of speeds of the propulsion driveline greater than the first range of speeds having a second slope, wherein the transfer functions and a transition point therebetween are both automatically calculated by the control module, the transition point calculated as a function of the locations of the neutral position and the position fully moved in at least one of the first and second directions determined during a calibration of the FNR lever such that the first slope can not be greater than the second slope and movements of the lever closer to the neutral position having the first slope result in a smaller change in the speed of the vehicle than movements further from the neutral position having the second slope.

8. The method of claim 7, wherein the first slope is about 50 percent less than the second slope.

* * * * *